March 7, 1933.   S. W. CADY   1,899,940
TRACTOR CULTIVATOR
Filed June 15, 1932   3 Sheets-Sheet 3
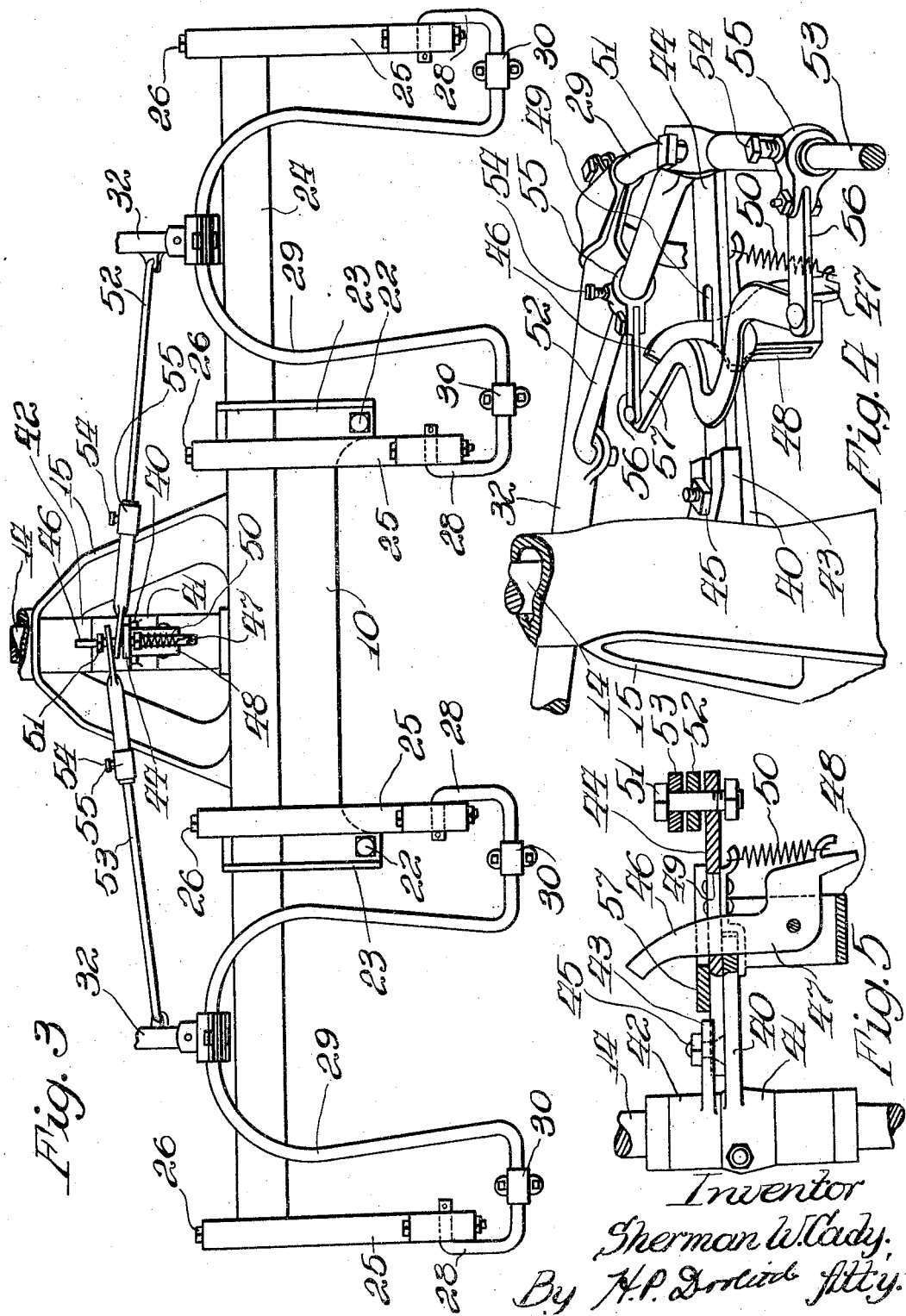

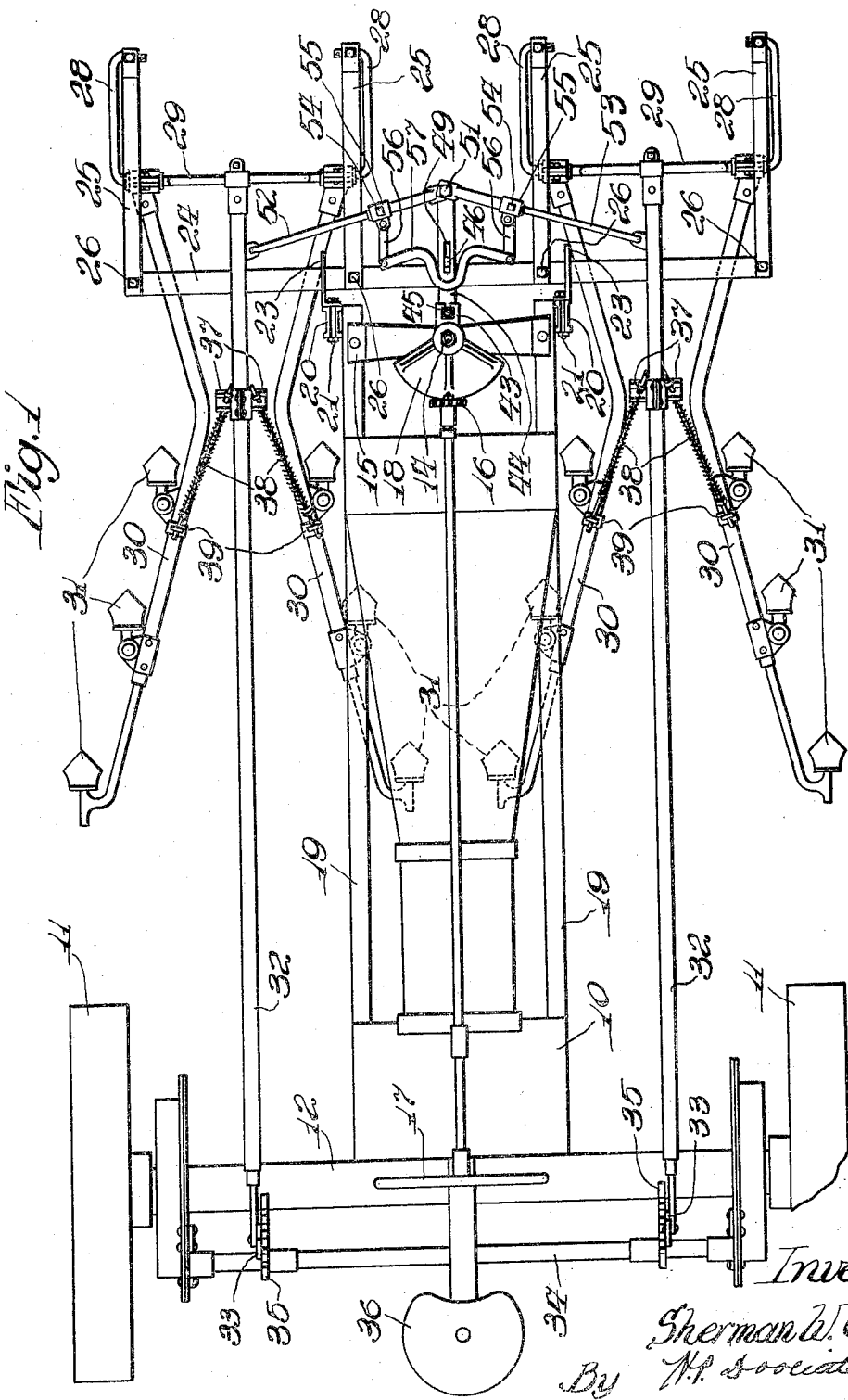

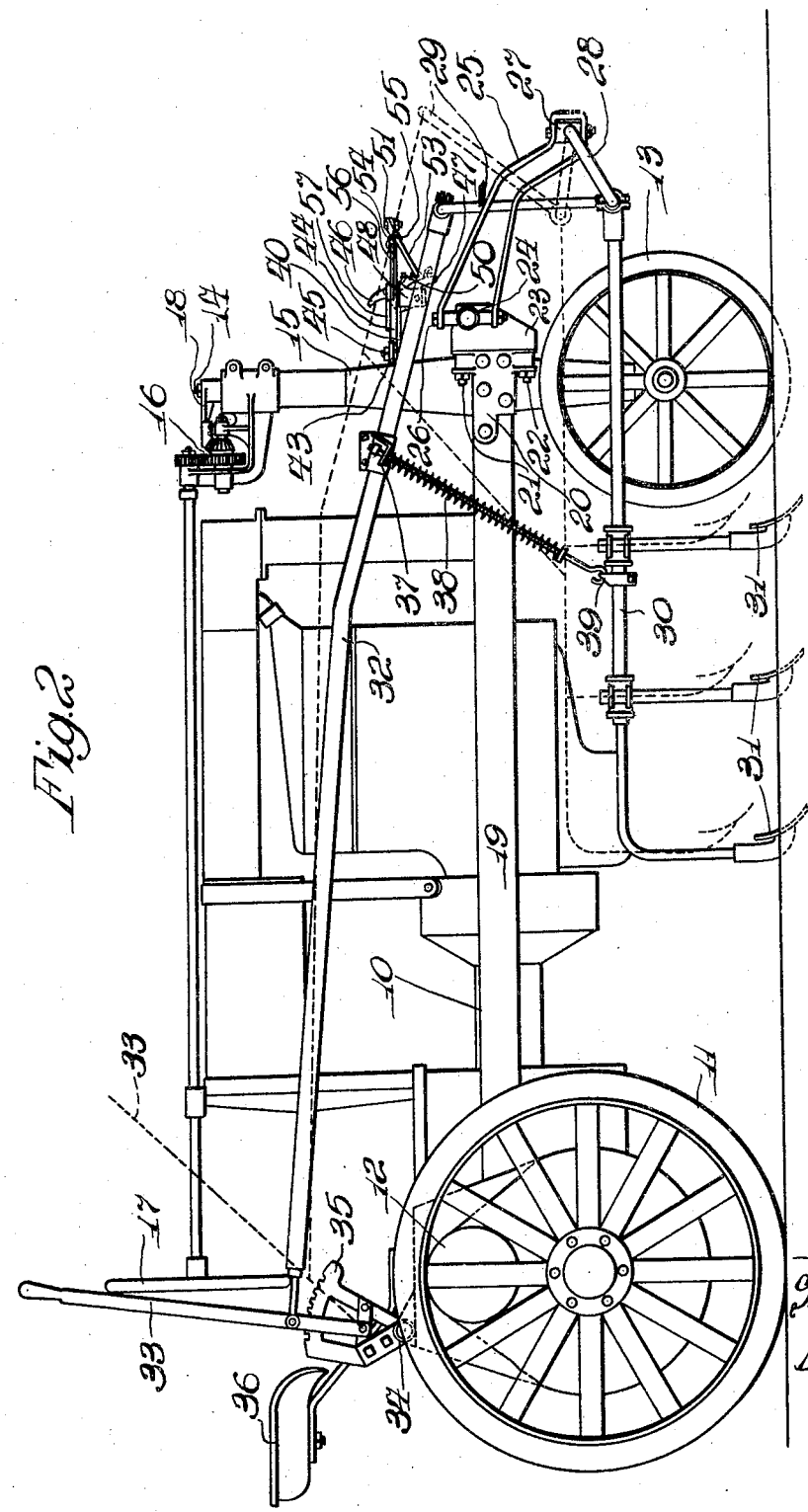

Patented Mar. 7, 1933　　　　　　　　　　　　　　　　　　　1,899,940

UNITED STATES PATENT OFFICE

SHERMAN W. CADY, OF CANTON, ILLINOIS, ASSIGNOR TO INTERNATIONAL HARVESTER COMPANY, A CORPORATION OF NEW JERSEY

TRACTOR CULTIVATOR

Application filed June 15, 1932. Serial No. 617,325.

This invention relates to improvements in earth working implements adapted for mounting on tractors, and more particularly to improvements directed to a straddle-row cultivator attachment of the type shown in the patent to Benjamin et al. No. 1,667,371, April 24, 1928, adapted for simultaneous cultivation of a plurality of plant rows.

The principal objects of the invention are to provide a cultivator attachment for tractors of the row-crop type having simplified and otherwise improved structure for supporting the earth working tools at each side of the front end of the tractor and for causing the lateral shifting, or "dodging" movements of the tools during travel. Also, to provide an attachment of the kind stated which has raising and lowering means that include means for effecting a parallel lift of the tool gangs at each side of the tractor and for spreading or moving the tool gangs away from the tractor as they are raised, and towards the tractor as they are lowered, thus causing such tools as are located immediately beneath the tractor body to clear it during the raising and lowering operations. A further object is to provide a simplified control for connecting and disconnecting the gang shifting device in conjunction with the lowering and raising of the tool gangs.

A preferred construction embodying the objects and advantages stated, as well as other advantages that will be obvious to those skilled in the art, is illustrated in the accompanying drawings, where:

Figure 1 is a plan view of a tractor cultivator embodying the invention;

Figure 2 is a side elevation thereof;

Figure 3 is a detail view of the cultivator attachment as seen from the front;

Figure 4 is a perspective side view, showing details of the shifting connection between the tractor and cultivator attachment; and, Figure 5 is a detail sectional view of latch mechanism shown in Figure 4.

The invention is here disclosed as in combination with a tractor of the well known row-crop type having a comparatively narrow main frame or body 10 supported on widely spaced rear traction wheels 11 adapted to span two plant rows of a crop, such as corn. The traction wheels are mounted on the outer sides of an upright, arched, rear axle structure 12 and the body 10 is supported at its front end on dirigible supporting means such as a centrally positioned steering truck 13, which has a vertical standard 14 journaled in the front crosshead 15 of the tractor. The truck is steered through gears 16, which transmit the rotation of a steering shaft and wheel 17 to the standard 14 through a gear sector 18 secured on the upper end of the standard of the steering truck. The tractor body includes side members or sills 19, between which the usual power plant, clutch and transmission are mounted. The foregoing tractor structure is more particularly described in the patent above referred to.

In the present instance, the tractor is provided with implement attaching brackets 20 at its forward corners, and these brackets are formed with open-side sockets to detachably receive the securing bolts 21, 22 carried on forwardly extending bracket plates 23. The bracket plates 23 have fixedly secured thereto a cross-member or bar 24, which extends beyond each side of the tractor body in a manner to overhang one or more plant rows at each side of the tractor body. Each projecting portion of the cross-member 24 carries a pair of spaced hanger members 25. These hanger members preferably extend forwardly and downwardly, as shown in Figure 2, and are pivoted to the cross-member 24 so as to be swingable laterally. In the present instance, the pivotal connection for each hanger member is shown as comprising a vertical pivot member or bolt 26 passing through the cross-member 24 and having its opposite ends carrying the upper end of the hanger member 25, which is preferably formed of a bar bent to shape and straddling the crossbar 24, as shown in Figure 2. At their lower ends, the hanger members are provided with bearing blocks 27, and each pair of bearing blocks on the respective sides of the tractor body has journaled therein the rearwardly extending cranks 28 which form the end portions of an upwardly arched member 29, the loop or body portion of which extends somewhat above the level of the crossbar 24. Each crank 28 has pivotally mounted thereon the forward end of a cultivator beam 30. These beams trail rearwardly in pairs at each side of the steering truck 13 and are provided with the usual earth working tools, such as gangs of cultivator shovels 31 disposed in straddle-row relation. The upper portion of each arched member 29 is pivotally connected to an upwardly and rearwardly extending lift rod 32, which extend to the rear end of the tractor where they connect to suitable mechanism for reciprocating the lifting rods. In this instance, this is illustrated as hand levers 33 which are used for setting the depth of the earth working tools and to which the rods 32 are pivotally connected, which levers are mounted on a cross-shaft 34 suitably mounted on the rear axle structure of the tractor. The usual rack sectors 35 are associated with each lever for locking them in position. The lifting means is, therefore, positioned on the rear of the tractor in convenient proximity to the operator's station or seat at 36.

At a point above the intermediate portions of the cultivator beams 30, each rod 32 is provided with a bracket having oppositely extending lugs or ears 37. Each of these ears is provided with an opening to slidably receive a spring pressed lifting link 38, which is suitably connected to a cultivator beam, as at 39. The lifting links 38 are so arranged that forward movement of a lifting rod 32 will swing the arched members 29 and carry the lifting links 38 forwardly in such a manner as to effect a substantially level or parallel lift of the cultivator beams in the manner indicated in dotted lines on Figure 2. Straddle-row cultivator assemblies, or units, are thus provided at each side of the tractor body.

In order to provide for lateral shifting or dodging movements of the cultivator assemblies above described, in unison with steering movement of the dirigible truck, the standard 14 of the truck is provided with a short, forwardly extending arm 40 integral with a collar 41 fixed on the standard (Figure 5). Immediately above the collar 41 the standard 14 carries a loose collar 42 which is free to turn on the standard 14. The collar 42 is formed with a short forward extension 43 which has secured thereto a forwardly extending coupling arm 44 which projects well beyond the fixed arm 40 below it. The coupling arm 44 is preferably secured to the short extension 43 by a clamp bolt 45. The fixed arm 40 is notched at its forward end to receive the upwardly extending arm 46 of a latch dog 47 pivoted on a bracket 48 secured to the under side of the coupling arm 44 adjacent the end of the fixed arm 40. The arm 44 is provided with a longitudinal slot 49 through which the arm 46 of the dog 47 extends, the slot 49 being adapted to register with the notch in the end of the short arm 40 when the two arms 40 and 44 are in alignment. A coil spring 50 connects the lower end of the dog 47 with the under side of the coupling arm 44 and causes engagement of the arm 46 in the notch on the arm 40 when these parts are in alignment. The free end of the coupling arm 44 has pivotally connected to it, by the bolt 51, the oppositely extending cross-links 52 and 53, the outer ends of which are pivotally connected to the respective lifting rods 32, as shown in Figure 1. The cross-links 52 and 53 are preferably formed of two telescoping sections which are secured at the desired adjustment by set screws 54 passing through collars 55 and engaging the inner section of the cross-links. It will be noted that the point of pivotal connection of the cross-links to the coupling arm 44 is forward of the points of pivotal connection of these links to the respective lifting rods 32. In order to provide for automatic control of the latch mechanism connecting the arms 40 and 44, each of the collars 55 on the cross-links is formed with a pair of rearwardly extending ears between which links 56 are pivoted. These links extend rearwardly and are connected to the ends of a flat crossbar 57 which rests on the coupling arm 44 in proximity to the arm 46 of the latch dog 47. The member 57 is preferably bent to provide a U-shaped depression at its center, which embraces the arm 46 and acts to guide or center the cultivating attachment when the lifting rods 32 are moved forwardly to raise the cultivator gangs and simultaneously disconnect the coupling arm 44 from the standard 14 of the steering truck.

With the construction above described, there is provided a fixed cross-member carrying laterally swingable hanger members from which the cultivator gangs at each side of the tractor trail. The cultivator assemblies are connected to the dirigible supporting means of the tractor in such a way that steering movement imparted to the dirigible means is transmitted to the cultivator assemblies, so that these are shifted laterally in unison and in parallel relation in the direction of steering movement. Also the assemblies are connected to the lifting and lowering means and to the steering means in such a way that, when the lifting rods 32 are reciprocated forwardly, the cultivating assemblies are raised, and also forced apart or swung away from each other sufficiently to assure that the inner cultivator beams, closest to the tractor, will not contact with the tractor body while being raised. This last function is due to the fact that the cross-links 52 and 53, which swing in arcs about the forwardly located pivot 51, will necessarily thrust the forward ends of the lifting rods 32 downwardly as these move forwardly and correspondingly shift the hanger members and parts carried thereby. As an incident of the lifting movement, the cross-links 52, 53 will carry the latch controlling member 57 forwardly a sufficient extent to cause engagement of the upright arm 46 of the latch dog 47, thereby releasing the coupling arm 44 from the standard 14 and permitting the tractor to be steered without affecting the cultivator gangs when these are raised. Reverse or lowering movement will, of course, reverse the movement above described and couple the cultivator attachment to the steering means when the gangs are lowered to operative position.

The embodiment above described illustrates a preferred form of the invention which may, however, be varied without departure from the scope of the invention as defined in the following claims.

What is claimed is:

1. The combination with a tractor having dirigible supporting means at its front end and means for steering same, of a cultivator attachment comprising a fixed bar extending across the forward end of the tractor and projecting beyond each side thereof, a pair of spaced hanger members pivoted on each projecting portion of the bar for movement laterally and extending downwardly therefrom, earth working means having beams trailing from the lower ends of said hanger members, and means actuated through the steering means for swinging the hanger members thereby shifting the earth working means laterally.

2. The combination with a tractor having dirigible supporting means at its front end and means for steering same, of a cultivator attachment comprising a fixed bar extending across the forward end of the tractor and projecting beyond each side thereof, a pair of spaced hanger members pivoted on each projecting portion of the bar for movement about vertical axes and extending in a fore and aft direction and at a downward inclination from the bar, earth working means having beams trailing from the lower ends of the hanger members, and means actuated through the steering means for swinging the hanger members thereby shifting the earth working means laterally.

3. The combination with a tractor having dirigible supporting means at its front end and means for steering same, of a cultivator attachment comprising a fixed bar extending across the forward end of the tractor and projecting beyond each side thereof, a pair of spaced hanger members pivoted on each projecting portion of the bar for movement about vertical axes and extending forwardly and downwardly, a straddle-row cultivating assembly connected to trail from each pair of hanger members, and cross-links connecting the dirigible front support with an element of each cultivator assembly whereby steering movement of the dirigible support causes lateral shifting movement of said assemblies.

4. The combination with a tractor having dirigible supporting means at its front end and means for steering same, of a cultivator attachment comprising a fixed bar extending across the forward end of the tractor and projecting beyond each side thereof, a pair of spaced hanger members pivoted on each projecting portion of the bar for movement about vertical axes and extending forwardly and downwardly, cranks pivotally mounted on the lower ends of each pair of hanger members, a trailing implement beam pivoted to each crank, an upright arch connecting the cranks of each pair and positioned between the hanger members, a rearwardly extending lifting and lowering rod connected to each arch and connected to actuating means on the rear portion of the tractor, lifting links connecting each rod with the respective beams, and cross-links connecting the dirigible front support for the tractor with the respective lifting rods whereby steering movement of the dirigible support causes lateral shifting movement of the hanger members and parts carried thereby.

5. The combination with a tractor having dirigible front supporting means including a vertical standard journaled on the tractor and steering means for turning the standard, of a cultivator attachment comprising a fixed bar extending across the forward end of the tractor and projecting beyond each side thereof, a pair of spaced hanger members pivoted on each projecting portion of the bar for movement laterally and extending downwardly therefrom, a straddle-row cultivating assembly connected to trail from each pair of hanger members, means for raising and lowering each cultivator assembly, an arm projecting from the vertical standard of the dirigible support, a link pivotally connecting an element of each assembly with the free end of said arm for joint movement, and means embodied in the connections between said arm and the cultivator assemblies for moving the cultivator assemblies away from each other as they are raised and towards each other as they are lowered.

6. The combination with a tractor having dirigible front supporting means including a vertical standard journaled on the tractor and steering means for turning the standard, of a cultivator attachment comprising a fixed bar extending across the forward end of the tractor and projecting beyond each side thereof, a pair of spaced hanger members pivoted on each projecting portion of the bar for movement laterally and extending downwardly therefrom, a straddle-row cultivating assembly connected to trail from each pair of hanger members, means for raising and lowering each cultivator assembly comprising a rearwardly extending lifting rod connected to each assembly and movable laterally therewith, means on the rear portion of the tractor for reciprocating said rods to cause lifting and lowering of the cultivator assemblies, an arm projecting forwardly from the vertical standard of the dirigible support, and pivoted links connecting the free end of said arm and each lifting rod at points on said rods located rearwardly of the free end of the arm, whereby steering movements will cause lateral movements of the cultivator assemblies in the same direction and reciprocation of the lifting rods will cause movement of said assemblies towards and away from each other.

7. The combination with a tractor having dirigible front supporting means including a vertical standard journaled on the tractor and steering means for turning the standard, of a cultivator attachment comprising a fixed bar extending across the forward end of the tractor and projecting beyond each side thereof, a pair of spaced hanger members pivoted on each projecting portion of the bar for movement about vertical axes and extending forwardly and downwardly, a pair of cultivator beams trailing from each pair of hanger members and connected thereto by vertically movable cranks, a rod connected to each pair of cranks and extending rearwardly above said fixed bar, means on the rear of the tractor for reciprocating said rods to swing the cranks to lift and lower the beams, an arm pivoted on and extending forwardly from the vertical standard, latch mechanism for releasably locking said arm to the standard, cross-links pivotally connecting the end of said arm with the respective rods and movable therewith, and latch actuating means connected to said cross-links and operating to release the arm from the standard when the rods are thrust forwardly to lift the beams and to cause said arm to become locked upon reverse movement of the rods.

8. The combination with a tractor, of a cultivator attachment comprising a bar extending across the forward end of the tractor and projecting beyond each side thereof, earth working tools located at each side of the tractor including drag beams connected to the projecting portions of said bar for lateral shifting movement, means on the tractor for lifting and lowering the earth working tools, and means for shifting said tools away from the tractor as they are raised and towards the tractor as they are lowered.

In testimony whereof I affix my signature.

SHERMAN W. CADY.